106. COMPOSITIONS, COATING OR PLASTIC.

83

Patented Apr. 3, 1934

1,953,085

UNITED STATES PATENT OFFICE 1,953,085

PAPER WAXING COMPOSITION

George James Manson, Hawkesbury, Ontario, Canada

No Drawing. Application March 14, 1927, Serial No. 175,439

2 Claims. (Cl. 134—1)

This invention relates to a composition intended to be used to render fibre such as paper stock, and the like, resistant to water, and relates particularly to a composition containing waxy material in a dispersed form.

The usual procedure in the sizing of paper pulp, with, for example, rosin size, is that of adding a rosin soap or mixture of rosin and rosin soap to the paper pulp in the beater engine and after mixing thoroughly with the pulp to add a precipitant or coagulant; alum being the material usually employed for such purposes.

In accordance with the present invention a product is obtained from a wax such as paraffin wax which contains wax particles in so fine a form of division or in some peculiar form of dispersion, such that a precipitant is not necessarily required to secure adhesion of the particles of wax to the cellulose fibres.

The waxy element or ingredient of the composition preferably is essentially paraffin wax and for this purpose, in some cases, scale wax or other cheap grades of paraffin wax may be employed.

Wax preferably is first incorporated with, for example, a solution of silicate of soda and an emulsion produced, whereupon a quantity of a precipitant such as hydrated lime, alum, and the like, is added to react completely with the silicate of soda. By this procedure the wax is obtained in a dispersed form having the property aforesaid of becoming occluded or taken up by moist fibres of wood or cellulose.

In some cases a protective colloid such as a small amount of glue, casein, and the like, may form an ingredient of the composition, being added preferably with the silicate of soda. In other cases the wax may contain a small amount of oleic or stearic acid. In still other cases the wax may have incorporated with it a varying proportion of vegetable waxes such as candelilla or carnauba wax or an acidic mineral wax such as Montan wax or Montanic acid. The incorporation of such hard waxes with the paraffin wax serves to modify its melting point and to some extent its properties of dispersion.

The wax or mixture of waxes may be incorporated with the silicate of soda by melting the former and placing in an agitator, whereupon the solution of silicate of soda is added and the mixture thoroughly agitated for a short time. Then a precipitant, for example, a quantity of alum equivalent to the sodium silicate is added and agitation continued for an additional brief period, whereupon the dispersed wax composition is obtained ready for use. Preferably this composition should contain from 25 to 30 per cent of waxy material and preferably, though not necessarily, such compositions should be practically neutral to ordinary tests such as that with litmus. Its pH value preferably should range from 7 to 7.3.

Examples of such compositions are the following:—

Example 1

|  | Parts by weight |
|---|---|
| Paraffin wax | 33 |
| Silicate of soda | 4 |
| Alum | 2 |
| Glue | 1 |
| Water | 60 |

The silicate of soda used in the above formula is a commercial form of syrupy consistency containing about 50 per cent of water. This silicate of soda syrup was mixed with 65 per cent of the total water. The remaining 35 per cent of the total water was used to dissolve the alum. The glue was added to the diluted silicate of soda. The wax composition was prepared by first melting the wax, adding the silicate of soda solution containing the glue and agitating, finally adding the alum solution with agitation. The temperature at which the composition is prepared is about 170° F.

Example 2

|  | Parts by weight |
|---|---|
| Paraffin wax | 32.5 |
| Montan wax | 0.85 |
| Silicate of soda | 5 |
| Alum | 2.75 |
| Glue | 0.4 |
| Water | 58.5 |

In this case, as in Example 1, the silicate of soda specified is a syrup containing about 50 per cent of water. In like manner this syrup is diluted with 65 per cent of the total water and the alum is dissolved in the remainder of the water employed.

The glue is dissolved in the silicate of soda solution. It is desirable to add 1 or 2 per cent of phenol, based on the amount of glue, in order to preserve the latter. The waxes are melted together and the silicate of soda solution containing the glue is added thereto with thorough agitation, the temperature being about 170° F. The alum solution is then added and agitation continued for a short time.

Example 3

| | Parts by weight |
|---|---|
| Paraffin wax | 31 |
| Montan wax | 7 |
| Silicate of soda | 2.65 |
| Alum | 1.35 |
| Water | 58 |

The silicate of soda syrup is diluted with a part of the water and the alum is diluted with the remainder, somewhat similar to the manner set forth in Examples 1 and 2. The waxes are melted together and the silicate of soda solution is added thereto with vigorous agitation at a working temperature of 170° F. When the incorporation is thoroughly effected the alum solution is introduced. A very fine wax dispersion results.

Example 4

| | Parts by weight |
|---|---|
| Paraffin wax | 37 |
| Quick lime | 1.7 |
| Alum | 4.6 |
| Water | 56.7 |

The quick lime is treated with about 65 per cent of the total water and the alum is dissolved in the remaining water. The wax is melted and placed in an agitator and the milk of lime is added. After stirring vigorously for about one minute the alum solution is added and agitation continued for two minutes, when the wax composition is ready for use. As in the foregoing, it is recommended that the working temperature in the preparation of the wax composition be about 170° F.

The foregoing compositions serve to illustrate the present invention, but it should be understood that these procedures are set forth solely for illustrative purposes and that various modifications with respect to proportions, temperatures and procedure and manner of incorporation may be utilized, also that substances of an equivalent character may replace one or more of the foregoing constituents.

I prefer to dilute the wax composition (which comes from the agitator containing approximately 30 per cent of waxy material) until it contains about 5 per cent of waxy material and add it in the diluted state to the beater through a screen of about 60 mesh. I have found that this insures a better dispersion through the stock in the beater. When using waxes containing rosin soaps and free rosin it is necessary to closely control the acidity of the stock after the size is added to assure proper coagulation of the size on the fibres, this acidity having a value corresponding to pH of about 4.5. Rosin size, furthermore, should be preferably added to stock that is slightly alkaline. I have found that when the wax composition involved in the present invention is used that the acidity of the paper stock, after said composition is added, is not at all critical, and may vary from an acidity corresponding to a pH value of 4.5 to 7, without affecting the retention of the wax by the fibre. I have also found that the wax composition can be added to the pulp if the pulp is acid, that is, corresponding to a pH value of from 5 to 6.5. In this case it is not necessary to add any further precipitant such as alum. This allows of a considerable saving of alum. The stock being less acid increases the life of the various parts of the system such as pumps, piping and wires.

The following will serve as an illustration of the beneficial effect of the use of this wax composition:

A plant engaged in the forming of pulp articles and using standard rosin size had considerable difficulty due to the rosin adhering to the wires on the forming machines, making a product which had badly formed edges and holes. They also had trouble with their piping system and pumps on account of the acidity of the stock due to the use of the amount of alum necessary to precipitate the rosin size. In this plant when rosin size was discontinued and a wax composition made in the manner above set forth was employed, no trouble was experienced with the products sticking to the wires on the forming machine, and furthermore the production was increased at least 15 per cent, with the product being uniformly much cleaner on the edges and tougher, that is, not as brittle as previously.

As the pulp was nearly neutral to litmus when the wax size was used there would not be the expected deterioration of the pipings and pumps consequent on the procedure involved in using rosin size.

I have found that using wax composition mentioned above, a retention of the wax on the fibres of from 75 per cent to 90 per cent, depending on the nature of the stock resulted. Moreover, any wax that is not retained on the fibre does not adhere to the felts or wires of the paper machine or forming machines, but is carried away with the "white water". Wax which does not adhere to the pulp fibres must not adhere to the felt and to the wires, as this would prevent drainage of the pulp sheet and cause holes in the sheet, or spots on the surface of the sheet.

I have found that the addition of only 1½ per cent of wax will give water resisting qualities satisfactory for the ordinary uses to which paper products are put, although for special purposes the amount of wax can be increased to 4 or 5 per cent. I have found that the addition of wax up to 5 per cent tends to increase the strength and to improve the rattle or stiffness. This is a surprising result as paraffin wax has been supposed to have a lubricating action on fibres and thus yield a weak limp paper. Paper containing this wax dispersion is not as susceptible to changes in atmospheric moisture, and for this reason is peculiarly adapted to use in the printing trade where it is necessary to register two or more impressions. I have found that paper containing 1 to 1½ per cent of wax and 1 to 2 per cent of rosin, the rosin being added as ordinary rosin size, does not lose strength when subjected to the action of a greasy material as paper does when it is only sized with the ordinary rosin size. This property makes the use of emulsion in paper for food containers and greasy articles very valuable.

When the plant aforesaid was using rosin size it was necessary for them to use fresh water in the beater and to dilute the stock before it went to the forming machines. As this water was pumped from artesian wells it was an item of considerable expense. With the wax composition the plant could be worked in a closed system, that is, the water drained from the forming machines was returned to the beaters and the makeup chests. It is possible to do this when using the wax composition because the wax therein is not critical as regards the acidity of the stock in the beater when the said composition is added and the amount of alum necessary to adjust the acidity is very small. In the particular instance cited, less than one-tenth of the alum that was used with the rosin size was used with the wax composition.

The formation of a wax dispersion composition in the manner described above, that is, adding a precipitating substance to a mixture of wax, water and an emulsifying agent produces what may be termed a pre-set wax dispersion. Instead of forming an emulsion of wax by means of an emulsifying substance such as soap, adding this emulsion to the pulp in the beater, and then introducing a precipitant, I prefer to accomplish a part at least of the precipitation in advance of introduction of the wax dispersion or emulsion into the paper pulp stock. By employing such a pre-set or partially pre-set wax dispersion composition, preferably containing paraffin wax as the principal waxy component, I am enabled to produce a composition having the novel property of being absorbable by paper pulp stock in large proportion, that is, the major proportion of the wax is readily taken up by the pulp, with or without the addition of additional precipitant, and the minor proportion of said dispersion composition, usually representing only from 10 to 20 per cent of the entire wax, being capable of passing through the screen, felt or other web (upon which the pulp is formed into a sheet) without fouling and obstructing said web. In this respect I believe that I have obtained a wax dispersion composition possessing qualities of great importance in the manufacture of water resisting paper, pressboard, and the like.

What I claim is:—

1. A wax dispersion composition comprising an emulsion of paraffin wax and sodium silicate, to which emulsion alum has been added as a chemically reacted precipitant.

2. The process of making a wax dispersion composition which comprises emulsifying paraffin wax in a solution of sodium silicate, and then adding alum thereto as a precipitant.

GEORGE JAMES MANSON.